INVENTORS.
Seth S. Barker.
Edward Crane
Allen W. Sharp.
by Bair, Freeman & McGuire
Attorneys United States Patent Office
2,813,298
Patented Nov. 19, 1957

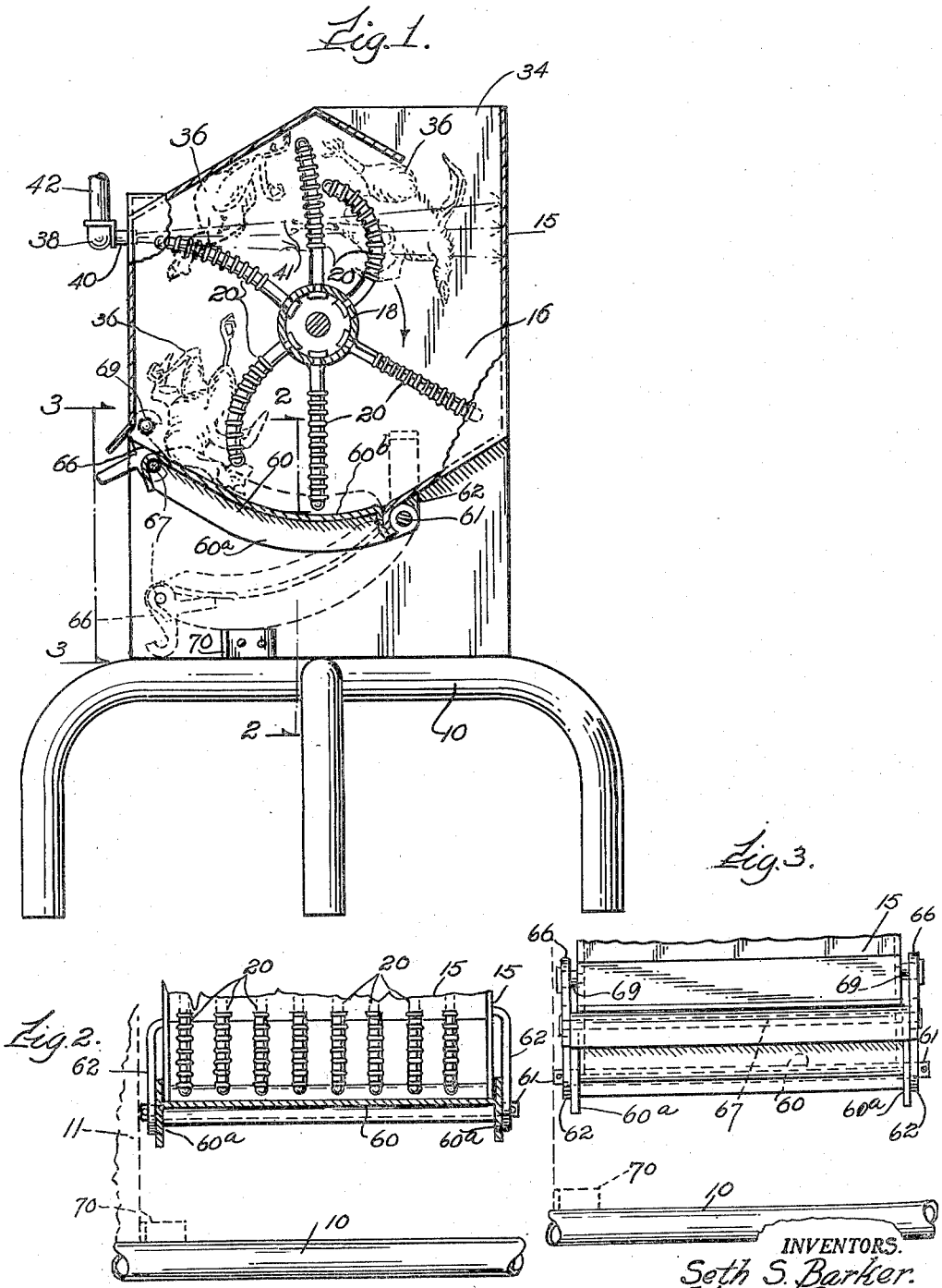

2,813,298

PROCESS FOR SCALDING ANIMALS

Seth S. Barker, Edward J. Crane, and Allen W. Sharp, Ottumwa, Iowa, assignors to Barker Poultry Equipment Company, Ottumwa, Iowa, a corporation of Iowa Application August 9, 1954, Serial No. 448,687

14 Claims. (Cl. 17—45)

The present invention relates to the process and apparatus for scalding of animals preparatory to removing the normal epidermal outgrowth from the skin of the animals. The invention, in its broadest aspect, is concerned with scalding of animals in general, and specifically to a method and apparatus for scalding of fowls.

Scalding of animals, including fowls, in plants where processing operations are performed on a commercial scale, has long presented serious problems to the processors. The most serious problem, which has continuously confronted the industry, pertains to the matter of lack of sanitation of the scald water employed. While the processes and apparatus heretofore employed have long been in disfavor and criticized as being extremely unsanitary by food inspectors and representatives of various governmental agencies, there has been no appreciable change made over the long period of years because no better processes and/or apparatus were known to exist.

While the present invention, in its broadest aspect, pertains in general to the scalding of animals, it will for convenience be herein described as specifically utilized in connection with scalding of fowls.

It is believed that in the year of 1926, fowls were for the first time commercially scalded in connection with large volume commercial dressing of fowls. At about this period of time, various concerns commenced the manufacture of scalding apparatus for use by processors of fowls, and considerable investigative and experimental work was done to determine the proper temperatures at which fowls should be scalded.

The present invention contemplates both a novel scalding process and apparatus by which the process may be carried out and by virtue of which fowls can be efficiently and properly scalded in a sanitary manner on a commercial basis.

The scalding process embodying the present invention produces a result between the prior methods of slack scald and high temperature scald. By our process, efficient loosening of all of the feathers is attained, and when the fowls are subjected to mechanical picking machines, all feathers, pin feathers and hair are removed, as well as removal of the outer cuticle of skin, in a manner equal to the high temperature scald, and which results in completely picked fowls without any cooking of the flesh. Our novel scalding process and apparatus attains these improved results in a very sanitary manner by employing a controlled amount of scald water, with a controlled heat content, applied in a novel manner to the feathers of the fowl. The temperature of the water employed in our scalding process, may vary from 122° F. up to 212° F. and the particular temperature of water selected obviously must be correlated with respect to the period of time the fowls are subjected to the application of the scald water.

One of the primary objects of this invention is to provide a novel process and apparatus for scalding animals on a mass production basis, in a sanitary manner, either individually or in small unit batches, so as to substantially eliminate all possible contamination by filth and bacteria from animals previously scalded.

Another object is to provide a novel sanitary scalding process and apparatus for commercial animal scalding which utilizes relatively small, controlled amounts of hot scald water for individual or small unit batches of animals, and which effects economies in the amount of hot water employed.

A further object is to provide a novel scalding process and apparatus which permits performing a high speed scalding operation upon animals in a manner so as to permit quick, easy and efficient removal of all of the normal epidermal outgrowth of the animal.

Still another object is to provide a novel sanitary scalding process and apparatus for fowls which permit efficient removal of all feathers, pin feathers and hair, as well as the outer cuticle of the fowls, with substantially no cooking of the flesh, and thus insuring obtaining dressed fowls of relatively uniform and high quality appearance.

A still further object is to provide a novel sanitary animal scalding process and apparatus wherein rapid and efficient scalding operations are performed by repeatedly pressing or squeezing small quantities of fresh scald water through the normal epidermal outgrowth of the animal, into intimate contact with the skin of the animal.

It is still another object to provide a novel animal scalding process and apparatus wherein scald water temperatures up to the approximate range of 212° F. may be employed in a manner for effecting a sanitary scalding operation and efficient loosening of the normal epidermal outgrowth of the animal for quick and easy removal.

A still further object is to provide a novel scalding apparatus for fowls, which utilizes a small amount of fresh scald water, applied to one or small unit batch of fowls, for single use, and wherein the fowls are free to move unrestrictedly within a confined chamber and mechanical pressure is continuously applied to the various portions of the body of the fowls in a manner for repeatedly pressing or squeezing small quantities of scald water through the feathers into intimate contact with the skin of the fowl for effecting a loosening of all of the feathers.

Other objects and advantages of this invention will be apparent from the following description taken in connection with the accompanying drawings, in which:

Figure 1 is a side elevation of the apparatus embodying the present invention, with parts broken away to show details of construction;

Figure 2 is a vertical section taken at line 2—2 on Figure 1;

Figure 3 is a partial front elevational view, taken at line 3—3 on Figure 1;

Figure 4:
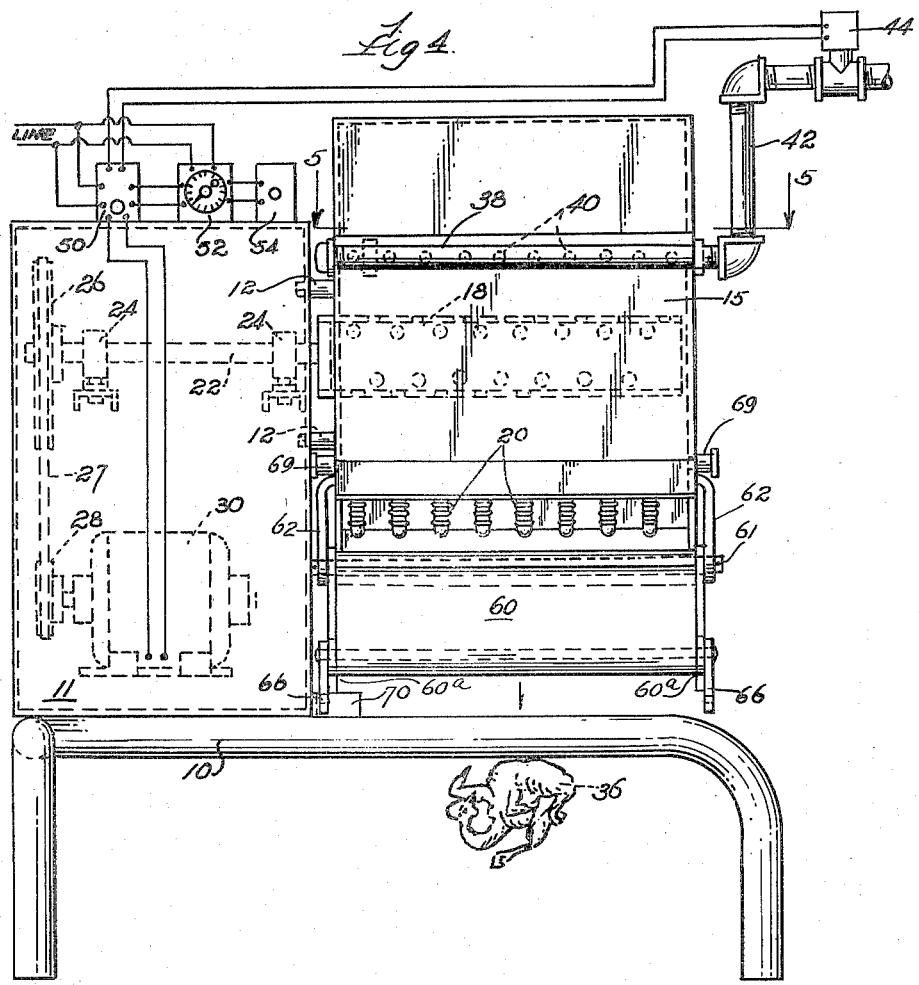
Figure 4 is a front elevation of the apparatus.

For convenience, we have herein illustrated in the drawings novel apparatus which may be used in connection with the performing of our novel scalding process for fowls. It is to be understood that for scalding of other animals, the apparatus may be varied in size and shape depending on the size and character of the animal to be scalded.

In the apparatus as illustrated in the drawings, we employ a suitable main supporting frame 10 on which is mounted an enclosed sheet metal housing 11, which surrounds suitable drive mechanism. Attached to the housing 11, by bolts 12, is a cabinet-like structure 15, defining a chamber 16 which, as shown, is of generally polygonal cross-section. The cabinet 15 is formed of sheet metal, and mounted substantially centrally therein is a rotatable drum 18, provided with a plurality of circumferentially spaced apart rows of radially extending flexible fingers 20. These fingers may be formed of any suitable resilient material, such as rubber or synthetic rubber, and are preferably corrugated throughout the major portion of their length, and in general may be said to correspond to flexible fingers as used in a conventional mechanical picking machine. As may be seen in the drawings, the outer ends of the fingers, when free, terminate in close proximity to the walls of the cabinet 15. The drum 18 is mounted on a shaft 22 which extends into the housing 11 and is supported on bearings 24. On the outer end of said shaft, within the housing, is a pulley 26, driven by a belt 27, from a pulley 28, mounted on the shaft of an electric motor 30.

The upper portion of the cabinet 15 has a section of its top wall cut away, and an adjacent side wall is extended upwardly to form an upwardly open hopper 34 through which fowls, indicated generally at 36, may be dropped into the cabinet for purposes of performing a scalding operation thereon.

Figure 5:
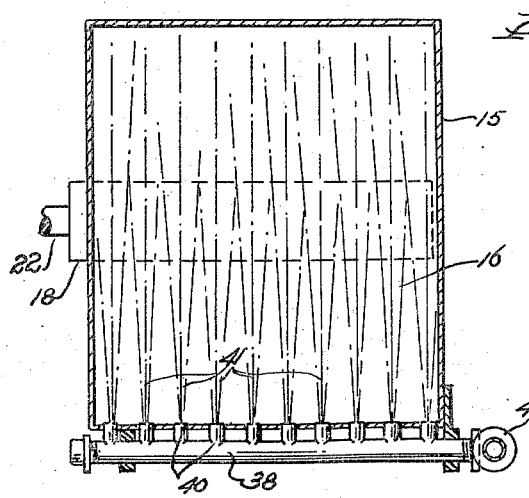
Figure 5 is a transverse, horizontal sectional view taken at line 5—5 on Figure 4.

Extending horizontally across the front upper portion of the cabinet 15, is a scald water header pipe 38, which is provided with a plurality of longitudinally spaced apart nozzles 40, which extend through the front side wall of the cabinet, as clearly seen in Figures 1, 4 and 5. The nozzles serve to project jets or sprays of scald water, as indicated at 41, across the chamber, in the path of the fingers of the rotatable drum, as seen in Figures 1 and 5 of the drawings. The header pipe 38 is connected by piping 42, to a suitable source (not shown) of scald water supply of a desired temperature. Interposed in the piping 42 is an electrically operated solenoid valve 44. The machine is controlled by a suitable switch 50, timer 52 and push button control 54, interconnected in electrical circuits, including the solenoid 44, in a suitable manner so that upon initially operating the push button control 54, suitable electrical circuits are established through the timer 52, and the switch 50 for driving the motor 30 and opening the solenoid valve 44, by virtue of which the rotor, including the drum 18 and its fingers 20, is rotated within the cabinet 15, and the solenoid valve 44 is opened to permit flow of a predetermined, small quantity of scald water through the header 38 and nozzles 40, into the casing, for a predetermined period of time, as controlled by the timer, after which all of the electrical circuits are opened, and the solenoid valve is again closed and the motor 30 is permitted to come to rest. During this operation the small quantity of scald water may either be immediately discharged, or may, if desired, be partially collected temporarily in a sump, as hereafter referred to.

In the apparatus as disclosed in the drawings, it is to be understood that the fowls 36, when engaged by the flexible fingers 20, are freely moved about within chamber 16 of the casing 15, and the impingement action of the flexible fingers is such, together with the polygonal cross-sectional form of the cabinet, to effect rolling, twisting and turning of the fowls in the process of being propelled around within the chamber 16 of the cabinet, during which time the fowl pass through the sprays 41 of scald water. The impingement action of the flexible fingers 20, upon the fowls is intermittent in that the fingers of successive rows are whipped into contact with the body of a fowl as it is turned, rolled, tumbled and repositioned within the chamber. This action of the fingers results in impinging upon the feathers of all the various areas of the entire body of the fowl, in a manner to exert a continuous series of intermittent application of compressive forces, by virtue of which small quantities of fresh scald water are repeatedly pressed or squeezed through the feathers of the fowl, into intimate contact with the skin of the fowl, so as to effect an efficient loosening of all of the feathers of the fowl, and by virtue of which such fowl, after scalding, when subjected to a picking action, such as a mechanical picker, permits quick and easy removal of all feathers, including pin feathers and hair, from the body of the fowl. Efficient penetration of the scald water through all the feathers of the fowl, over all areas, is attained by the combined action of the flexible fingers impinging upon the feathers of the fowl and the fowl being turned, and rolled freely in an unrestricted manner within the chamber 16, during the time that the rotor carrying the fingers is revolving.

By reason of the fact that the fowls are free to move unrestrictedly within the cabinet 15, the body, the legs, the wings, neck and head of the fowls are free to assume various positions as they are engaged by the flexible fingers 20, so that the fowl are continuously tumbling and turning about within the cabinet and the flexible fingers contact substantially all body areas of the entire fowl, from various angles and directions and thus, results in effecting a complete forced penetration of scald water through all of the feathers of the fowl, and thereby obtaining a complete and efficient scalding operation by virtue of which the feathers of the fowls may be quickly, easily and completely removed from the body of the fowl.

By virtue of the action of the fingers 20 impinging against the fowls, simultaneously with the introduction of the scald water, into direct contact with the feathers and the skin of the fowls, there also results a thorough washing and scrubbing action on both the feet and the head of the fowls, removing soil, blood and bacteria on the fowls, which greatly improves the sanitary condition of the fowls being immediately processed, as well as those being subsequently processed in the apparatus. This improved sanitary condition resulting from the scrubbing action taking place on the feet and head of the fowls during process of scalding is of great advantage, as compared with currently and previously employed processes, when keeping in mind that fowls, prior to being killed, normally stand on wire grates or grilles and have their feet contaminated with droppings and foodstuffs. Furthermore, the heads of the fowls, after being killed, usually become contaminated by the blood of the fowls. Such filth and contamination are sanitarily dispensed with by complete washing and removing in the process of scalding. It must be recognized that for many years last past, considerable effort and thought have been given to the possibility of devising suitable apparatus for mechanically scrubbing the feet of fowls as part of the processing operation. It has been found, however, that due to the fact that, in prior commercial systems, the fowls are suspended by their feet from a shackle on a conveyor, it is not possible to effect a proper scrubbing and cleansing operation without removal of the fowl from the shackle. It must also be recognized that in processing certain fowls, such as turkeys, there exist certain regulations, primarily from a sanitation standpoint, which necessitate scrubbing of the feet and head of such fowls.

In the machine, as illustrated, the lower wall thereof is formed with a movable section 60, constituting a door, which is pivotally mounted on a shaft 61, carried by brackets 62, secured to the end walls of the cabinet. The door includes end flanges 60a which are journaled on the shaft 61, and when the door is in closed position, as seen in Figure 1, it constitutes a portion of the wall of the cabinet. This door member, as shown in the drawings, is formed with an arcuate section 60b, which is located at the bottom thereof, and when the door is in closed position, said section 60b constitutes a sump for temporarily collecting and retaining some of the scald water introduced into the cabinet in the form of the spray 41, so that as the fowls are moved about within the cabinet, passing through the spray 41, they also pass through the small puddle of scald water which accumulates in the sump 60b, for further assisting in placing scald water in contact with the feathers of the fowls. After the fowls have been scalded for the desired period of time and the machine is shut off, the door 60 may be unlatched and tilted downwardly to the position shown in dotted lines in Figure 1, for discharging the fowls which have been scalded within the cabinet 15.

The door 60 is secured in closed position by hand-operated latches 66, mounted on the ends of a rod 67, carried on the underside of the leading edge of the door. These latches are adapted to cooperate with stud members 69, on opposite ends of the cabinet 15. When the door is in open position, as seen in Figure 1, said latches engage stop 70, carried on the housing 11, to position the door in inclined relation, as seen in dotted lines in Figure 1 and as seen in Figure 4.

It is to be understood that if desired, the lower portion of the cabinet, including the door section 60, may be so designed that the scald water in the form of sprays, which is not picked up and retained by the fowls being processed therein, which falls to the bottom of the cabinet, may be immediately drained away to a suitable discharge and hence, there will be no re-use whatsoever of the scald water in any manner, and the soil, contaminating matter and bacteria are immediately disposed of after each operation of the machine.

It is to be understood that in the machine, as illustrated in the drawings, an individual fowl may be processed therein, or a small unit batch of fowls may be simultaneously processed at one time, such as a batch comprising four fairly good size fowls or six comparatively small fowls. When small unit batches of fowls are thus processed, it will be apparent that the maximum possible extent of contamination of the fowls will be only by the other fowl making up the small batch.

In the construction herein disclosed, together with the novel scalding process, it has been found that a satisfactory scalding operation can be performed on either one or small unit batches of fowls by the use of approximately 1½ gallons of scald water. If six fowls are scalded in one batch, this amount of water used closely approximates the amount of water required for make-up in tank type scalders for the same number of fowls.

As is well known in the art, only the hot scald water that intimately contacts the skin of the fowls, is of any value; the heat that penetrates the skin to the feather follicles is what effects loosening of the feather quills. Since feathers are good heat insulators, it is necessary that the hot water penetrate the feathers and intimately contact the skin before it can perform the work of loosening feathers.

It has been found that very satisfactory scalding operations result when using scald water of varying temperatures. The period of time during which the scald water is introduced should, however, be proportionately varied. In other words, it has been found that a satisfactory scalding operation can be performed upon fowls when using water temperatures in the general range of 210° F. to 212° F. for a period of approximately ten seconds. It has also been found that satisfactory scalding operations can be performed utilizing water of a temperature in the range of 140° F. for a period of approximately fifteen seconds. When utilizing water temperatures below 140° F., it will be necessary that the period of time during which the scald water contacts the fowls be substantially increased.

Numerous important advantages result from the type of scalding embodying the present invention, namely:

(a) That by virtue of the use of flexible fingers for impinging upon the feathers simultaneously with introduction of scald water on the fowls, the scald water is immediately pressed or squeezed through the feathers into intimate contact with the skin of the fowls so as to raise the temperature of the skin portion of the fowl and effect efficient loosening of all feathers in a very short period of time. The scald water is applied in a manner, by the action of the flexible fingers, so as to cause small quantities of scald water to be repeatedly pressed through the feathers, replacing water previously pressed through the feathers and which has given up a portion of its heat in the skin and is no longer hot enough to loosen feathers.

(b) The amount of scald water used per individual fowl, or small batches of fowls, and which is discarded after each use, is economically practical and results in scalding in a sanitary manner.

(c) The sanitary condition resulting from our scalding operation by not using the same scald water over and over again, for large quantities of fowls being scalded, for the first time permits attaining a satisfactory sanitary scalding operation which is economically practical (as contrasted with former processes), involving continual use of small controlled quantities of fresh water for scalding, either individual or small unit batches of fowls.

(d) The scalding operation embodying the present invention results in substantially total elimination of all cooking of the flesh of the fowls. This results in greatly increasing the shelf life of the fowls.

Our novel scalding process produces results having certain of the advantages of the so-called slack scald, and the 140° F. temperature scald, in that cooking of the flesh is eliminated as in the slack scald, and complete loosening of the feathers is attained, as well as the removal of the outer cuticle is accomplished as in the usual 140° F. scald, as heretofore practiced. Further complete and uniform defeathering of fowls is capable of accomplishment, and results in substantially eliminating downgrading of the fowls. Our novel process results in applying scald water to the feathers of the fowls in such a manner that small quantities of fresh scald water are repeatedly pressed through the feathers of the fowls into intimate contact with the skin, regardless of the shingle effect or the thickness of the feather coating on various parts of the fowls.

Because of the extremely small quantity of scald water employed in properly scalding an individual fowl or a small batch of fowls, the matter of discarding the scald water after each use, together with the resultant loss of heat utilized in bringing the water up to the proper temperature, is deemed to result in a commercially practical and highly satisfactory scalding operation which substantially eliminates the unsanitary condition of contamination of fowls as currently exist in commercial poultry processing establishments. After the fowls have been scalded in accordance with the present invention, they may be transferred in any convenient manner to conventional picking machines wherein substantially all of the feathers, including pin feathers and hair, are quickly and easily removed from the body of the fowls.

Because of the relatively small amount of scald water employed and consequently, the small amount of heat in connection with each fowl processed, it is entirely practical from a commercial, economical aspect, not to re-use the scald water on other fowls. By mechanically pressing or squeezing, repeatedly, small quantities of scald water through the feathers of the fowls onto the skin of the fowls, effects a reduction in the amount of time required to perform an efficient and complete scalding operation, at a given temperature of water, and effects a relatively uniform distribution of heat to all parts of the fowls. Because of the nature of the scalding apparatus employed, it is now possible to dispense with the use of large scalding tanks and hence, only a relatively small amount of floor space is required for performing the scalding operation.

By our new scalding process and apparatus, fowls for the first time, may be sanitarily scalded on a practical, economical commercial basis because of the immediate disposal of the small quantity of scald water after each use on an individual fowl, or on a small batch of fowls.

A further advantage of the new scalding process and apparatus is that in process of scalding, substantially all soil, blood and bacteria on the body of the fowls is completely removed and disposed of so that it cannot be transmitted to and effect contamination of subsequently scalded fowls. The scalding process effects a complete washing and scrubbing of the fowl, including the head and feet and hence, results in a total cleansing of the fowls externally in a manner never heretofore obtainable on a commercial basis.

Although we have herein shown and described certain embodiments of our novel process and apparatus, manifestly it is capable of modification without departing from the spirit and scope thereof. We do not, therefore, wish to be understood as limiting the invention to the precise embodiments as set forth with respect to the process and apparatus, except as we may be so limited by the appended claims.

We claim:

1. The process of preparing an animal for removal of its normal epidermal outgrowth which consists in applying a controlled amount of scald water onto the body of the animal while simultaneously applying pressure to the epidermal outgrowth of the animal for causing said scald water to be pressed through said outgrowth and intimately contact the skin of the animal.

2. The process of scalding an animal which consists in repeatedly pressing small quantities of fresh scald water through the normal epidermal outgrowth of the animal into intimate contact with the skin of the animal.

3. The process of scalding an animal which consists in applying a controlled amount of scald water onto the body of the animal and repeatedly pressing fresh scald water through the normal epidermal outgrowth of the animal into direct and intimate contact with the skin for wetting and transferring heat to the skin of the animal.

4. The process of scalding an animal which consists in applying a controlled amount of scald water onto the body of the animal and simultaneously subjecting the normal epidermal outgrowth of the animal to pressure for repeatedly pressing small quantities of scald water through said epidermal outgrowth into contact with the skin of the animal.

5. The process of scalding an animal which consists in applying a controlled amount of scald water onto the body of the animal and simultaneously subjecting various portions of the body of the animal to the action of a series of applications of resilient pressure for causing small quantities of scald water to be repeatedly pressed through the normal epidermal outgrowth of the animal into intimate contact with the skin of the animal.

6. The process of scalding an animal which consists in repeatedly pressing small quantities of fresh scald water through the normal epidermal outgrowth of the animal into intimate contact with the skin of the animal for a period of less than 15 seconds.

7. The process of scalding an animal which consists in applying a controlled amount of scald water, of a temperature higher than 140° F. over the body of the animal for a time interval of less than 15 seconds and simultaneously applying pressure to the normal epidermal outgrowth of the animal, whereby small quantities of said scald water are repeatedly caused to be pressed through said epidermal outgrowth and intimately contact the skin of the animal for transferring heat from said water to the skin of the animal.

8. The process of scalding an animal which consists in applying a controlled amount of scald water over the body of the animal and simultaneously and repeatedly applying pressure to the normal epidermal outgrowth of the animal for repeatedly causing small quantities of fresh scald water to be pressed through said epidermal outgrowth and intimately contact the skin of the animal and effect transfer of heat from the water to the skin of the animal.

9. The process of scalding an animal which consists in applying a controlled amount of scald water onto the body of the animal and simultaneously applying pressure to the normal epidermal outgrowth of the animal while said animal is free to move and expose different areas to the scald water and pressure for repeatedly causing small quantities of scald water to be pressed through said epidermal outgrowth and intimately contact the skin of the animal.

10. The process of scalding fowls which consists in applying a controlled amount of scald water onto the body of the fowls while simultaneously and repeatedly applying pressure against the feathers of the fowls for repeatedly causing small quantities of scald water to be pressed through the feathers and intimately contact the skin of the fowls for loosening the feathers.

11. The process of scalding fowls which consists in applying a controlled amount of scald water, of a temperature range between 140° F. and 212° F. onto the body of the fowls while simultaneously and repeatedly applying pressure against the feathers of the fowls for repeatedly causing small quantities of scald water to be pressed through the feathers and intimately contact the skin of the fowls for loosening the feathers.

12. The process of scalding fowls which consists in applying a controlled amount of scald water, for a period of time not exceeding 15 seconds, onto the body of the fowls while simultaneously and repeatedly applying pressure against the feathers of the fowls for repeatedly causing small quantities of scald water to be pressed through the feathers and intimately contact the skin of the fowls for loosening the feathers.

13. The process of scalding fowls which consists in applying a controlled amount of scald water onto the body of the fowls while simultaneously and repeatedly applying pressure against the feathers of the fowls, while the fowls are totally free to move and expose different areas of their bodies to the action of the scald water and pressure, for repeatedly causing small quantities of scald water to be pressed through the feathers and intimately contact the skin of the fowls for loosening the feathers.

14. The process of simultaneously scalding a small number of fowls, as a batch operation, which consists in applying a controlled amount of scald water onto the body of the fowls and at the same time repeatedly applying pressure against the feathers of the fowls, while the fowls are free to move within a confined chamber, by the action of the pressure, thereby continuously exposing different areas of the body of the fowls to the action of the scald water and pressure for repeatedly causing small quantities of scald water to be pressed through the feathers into intimate contact with the skin of the fowls for loosening the feathers.

References Cited in the file of this patent

UNITED STATES PATENTS

| | | |
|---|---|---|
| 1,672,555 | Barker et al. | June 5, 1928 |
| 1,730,964 | Barker et al. | Oct. 8, 1929 |
| 2,084,857 | McKee et al. | June 22, 1937 |
| 2,642,618 | Stubelek | June 23, 1953 |